(12) United States Patent
Guthrie et al.

(10) Patent No.: US 8,327,074 B2
(45) Date of Patent: *Dec. 4, 2012

(54) SYNCHRONIZING ACCESS TO DATA IN SHARED MEMORY VIA UPPER LEVEL CACHE QUEUING

(75) Inventors: Guy L. Guthrie, Austin, TX (US); William J. Starke, Round Rock, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/445,080

(22) Filed: Apr. 12, 2012

(65) Prior Publication Data

US 2012/0198167 A1 Aug. 2, 2012

Related U.S. Application Data

(63) Continuation of application No. 12/650,961, filed on Dec. 31, 2009.

(51) Int. Cl.
*G06F 12/00* (2006.01)
(52) U.S. Cl. .................. 711/122; 711/E12.024
(58) Field of Classification Search .................. 711/122, 711/E12.024
See application file for complete search history.

(56) References Cited

U.S. PATENT DOCUMENTS

| | | | | |
|---|---|---|---|---|
| 5,333,319 | A * | 7/1994 | Silen | 718/103 |
| 6,665,699 | B1 * | 12/2003 | Hunter et al. | 718/102 |
| 2002/0087815 | A1 * | 7/2002 | Arimilli et al. | 711/155 |
| 2006/0085603 | A1 * | 4/2006 | Guthrie et al. | 711/141 |
| 2006/0212653 | A1 * | 9/2006 | Alexander et al. | 711/122 |
| 2007/0033345 | A1 * | 2/2007 | Guthrie et al. | 711/122 |
| 2008/0140936 | A1 * | 6/2008 | Guthrie et al. | 711/118 |

* cited by examiner

*Primary Examiner* — Edward Dudek, Jr.
*Assistant Examiner* — John P Fishburn
(74) *Attorney, Agent, or Firm* — Yudell Isidore Ng Russell PLLC

(57) ABSTRACT

A processing unit includes a store-in lower level cache having reservation logic that determines presence or absence of a reservation and a processor core including a store-through upper level cache, an instruction execution unit, a load unit that, responsive to a hit in the upper level cache on a load-reserve operation generated through execution of a load-reserve instruction by the instruction execution unit, temporarily buffers a load target address of the load-reserve operation, and a flag indicating that the load-reserve operation bound to a value in the upper level cache. If a storage-modifying operation is received that conflicts with the load target address of the load-reserve operation, the processor core sets the flag to a particular state, and, responsive to execution of a store-conditional instruction, transmits an associated store-conditional operation to the lower level cache with a fail indication if the flag is set to the particular state.

6 Claims, 13 Drawing Sheets

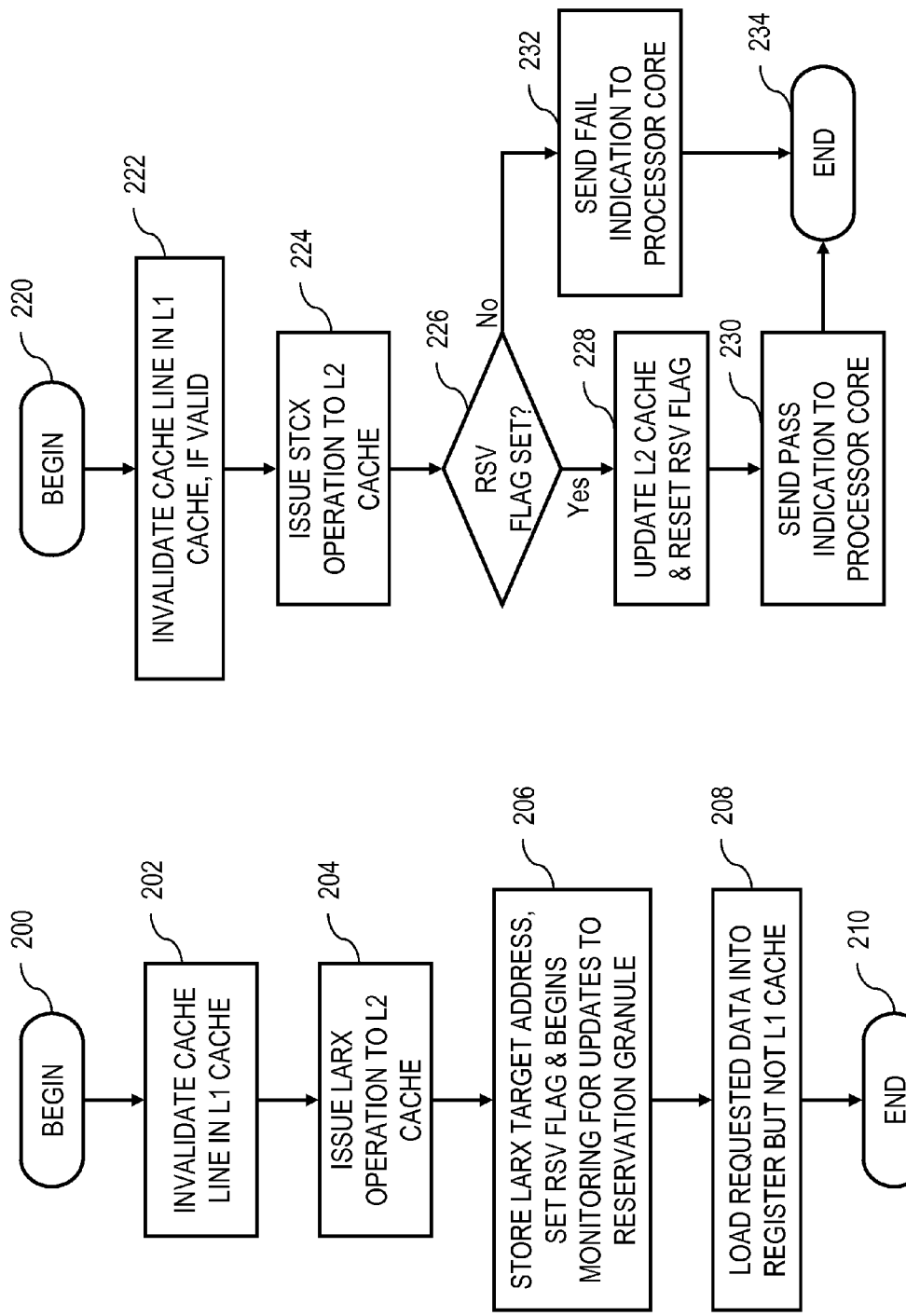

SYNCHRONIZING ACCESS TO DATA IN SHARED MEMORY VIA UPPER LEVEL CACHE QUEUING

This application is a continuation of U.S. patent application Ser. No. 12/650,961 entitled "SYNCHRONIZING ACCESS TO DATA IN SHARED MEMORY VIA UPPER LEVEL CACHE QUEUING" by Guy L. Guthrie et al. filed Dec. 31, 2009, the disclosure of which is hereby incorporated herein by reference in its entirety for all purposes.

BACKGROUND OF THE INVENTION

1. Technical Field

The present invention relates in general to data processing system and, in particular, to managing accesses to shared data in a data processing system. Still more particularly, the present invention relates to a processor, data processing system and method for synchronizing accesses to data in shared memory.

2. Description of the Related Art

In shared memory multiprocessor (MP) data processing systems, each of the multiple processors in the system may access and modify data stored in the shared memory. In order to synchronize access to a particular granule (e.g., cache line) of memory between multiple processing units and threads of execution, load-reserve and store-conditional instruction pairs are often employed. For example, load-reserve and store-conditional instructions have been implemented in the PowerPC® instruction set architecture with operation codes (opcodes) associated with the LWARX and STWCX mnemonics, respectively (referred to hereafter as LARX and STCX). The goal of load-reserve and store-conditional instruction pairs is to load and modify data and then to commit the modified data to coherent memory only if no other thread of execution has modified the data in the interval between the load-reserve and store-conditional instructions. Thus, updates to shared memory can be synchronized without the use of an atomic update primitive that strictly enforces atomicity.

With reference now to FIG. 1, a block diagram of a conventional MP computer system supporting the use of load-reserve and store-conditional instructions to synchronize updates to shared memory is illustrated. As shown, computer system 100 includes multiple processing units 102a-102b for processing data and instructions. Processing units 102 are coupled for communication to a system bus 104 for conveying address, data and control information between attached devices. In the depicted embodiment, the attached devices include a memory controller 106 providing an interface to a system memory 108 and one or more host bridges 110, each providing an interface to a respective mezzanine bus 112. Mezzanine bus 112 in turn provides slots for the attachment of additional devices, which may include network interface cards, I/O adapters, non-volatile storage device adapters, additional bus bridges, etc.

As further illustrated in FIG. 1, each processing unit 102 includes a processor core 120 containing an instruction sequencing unit 122 for fetching and ordering instructions for execution by one or more execution units 124. The instructions and associated data operands and data results are stored in a multi-level memory hierarchy having at its lowest level system memory 108, and at its upper levels L1 cache 126 and L2 cache 130. The data within the memory hierarchy may generally be accessed and modified by multiple processing units 102a, 102b.

L1 cache 126 is a store-through cache, meaning that the point of cache coherency with respect to other processing units 102 is below the L1 cache (e.g., at L2 cache 130). L1 cache 126 therefore does not maintain true cache coherency states (e.g., Modified, Exclusive, Shared, Invalid) for its cache lines, but only maintains valid/invalid bits. Store operations first complete relative to the associated processor core 120 in the L1 cache and then complete relative to other processing units 102 in L2 cache 130.

As depicted, in addition to the L2 cache array 140, L2 cache 130 includes read-claim (RC) logic 142 for managing memory access requests by the associated processor core 120, snoop logic 144 for managing memory access requests by other processing units 102, and reservation logic 146 for recording reservations of the associated processor core 120. Reservation logic 146 includes at least one reservation register comprising a reservation address field 148 and a reservation flag 150.

FIG. 2A depicts the manner in which a load-reserve (e.g., LARX) instruction is processed in data processing system 100 of FIG. 1. As shown, the process begins at block 200, which represents the execution of a LARX instruction by execution units 124 of processing unit 102a in order to determine the target address from which data is to be loaded. Following execution of the LARX instruction, L1 cache 126 invalidates the cache line containing the target address at block 202. The cache line is invalidated in L1 cache 126 to prevent the LARX instruction from binding to a potentially stale value in L1 cache 126. The value is potentially stale because another processing unit 102 may have gained ownership of the target cache line in order to modify it.

Following block 202, the process passes to block 204, which illustrates processor core 120 issuing a LARX operation corresponding to the LARX instruction to RC logic 142 within L2 cache 130. As depicted at bock 206, RC logic 142 stores the address of the reservation granule (e.g., cache line) containing the target address in reservation address field 148 and sets reservation flag 150. Reservation logic 146 then begins monitoring for an indication by snoop logic 144 that another processing unit 102 has updated the cache line containing the target address. As illustrated at block 208, RC logic 142 obtains the load data from L2 cache array 140, system memory 108 or another processing unit 102 and then returns the requested load data to processor core 120. In response to receipt of the load data, processor core 120 stores the load data in an internal register, but not in L1 cache 126.

Processor core 120 thereafter attempts to perform an atomic update to the load data through the execution of a store-conditional (e.g., STCX) instruction in accordance with the process depicted in FIG. 2B. As shown, the process begins at block 220, which represents execution units 124 executing the store-conditional instruction to determine the target address of the store-conditional operation. Next, as depicted at block 222, the cache line containing the target address is invalidated in L1 cache 126, if valid. Although the cache line was invalidated earlier at block 202, the invalidation is still performed at block 222 because an intervening load operation to another address in the cache line may have caused the cache line to be loaded back into L1 cache 126.

Following block 222, processor core 120 issues a store-conditional (e.g., STCX) operation corresponding to the store-conditional instruction to RC logic 142 within L2 cache 130, as shown at block 224. RC logic 142 obtains owner permission for the target cache line and then determines at block 226 whether or not reservation flag 150 is still set (i.e., whether or not any other processing unit 102 has modified the reservation granule). If reservation flag 150 is still set, indicating that no other processing unit 102 has modified the reservation granule, RC logic 142 updates L2 cache array 140 with the store data and resets reservation flag 150, as shown at block 228. Reservation logic 146 then sends a pass indication to processor core 120, as shown at block 230. Thereafter, the process ends at block 234.

Returning to block 226, in response to a determination that reservation flag 150 is reset, indicating that another processing unit 102 has modified the reservation granule in the interval between execution of the load-reserve and store-conditional instructions, the store-conditional operation fails in L2 cache 130, and reservation logic 146 transmits a fail indication to processor core 120, as depicted at block 232. Thereafter, processing of the store-conditional operation terminates at block 234.

FIG. 2C illustrates the conventional operation of snoop logic 144 in support of shared memory updates utilizing load-reserve and store-conditional instructions. As depicted, the process begins at block 240 and thereafter proceeds to block 242, which illustrates the process iterating until snoop logic 144 snoops an operation on system bus 104. When snoop logic 144 snoops an operation on system bus 104, snoop logic 144 allocates a snooper to handle the operation at block 244. The snooper determines at block 246 whether or not the snooped operation is a storage-modifying operation. If not, the process passes to block 252 for other processing and thereafter terminates at block 254. If, however, the snooper determines that the snooped operation is a storage-modifying operation, the snooper makes a further determination at block 248 whether the address of the modifying operation matches the contents of reservation address field 148. If so, the snooper resets reservation flag 150 to cause any subsequent store-conditional operation to the address specified in reservation address field 148 to fail, as shown at block 250. Following block 250 or following a determination at block 248 that the address of the snooped storage-modifying operation matches the contents of reservation address field 148, the snooper performs other processing at block 252 (e.g., updating the directory of L2 cache array 140 and, if necessary, sending the storage-modifying operation to L1 cache 126 to invalidate a cached copy of the target cache line of the storage-modifying operation). The process thereafter terminates at block 254.

SUMMARY OF THE INVENTION

The present invention appreciates that the above-described conventional technique of updating shared memory utilizing load-reserve and store-conditional instructions has a number of drawbacks. For example, the conventional methodology described with respect to FIGS. 2A-2B is subject to significant communication latency in that it always requires two separate "round trip" communications between processor core 120 and L2 cache 130. The first "round trip" includes the issuance of a load-reserve operation to L2 cache 130 at block 204 and the return of the load data at block 208, and the second "round trip" includes the issuance of a store-conditional operation to L2 cache 130 at block 224 and the return of a pass/fail indication at block 230.

In addition, the conventional technique of updating shared memory utilizing load-reserve and store-conditional instructions disadvantageously results in the invalidation of the target cache line in L1 cache 126. As will be appreciated, one advantage of caching data is that software often exhibits locality of reference, meaning that data within the same cache line as the data updated by the load-reserve/store-conditional pair is frequently referenced by other nearby instructions. Unfortunately, the invalidation of the cache line in L1 cache 126 delays the execution of such instructions until the cache line is loaded back into L1 cache 126 from L2 cache 130.

In view of these and additional shortcomings in the prior art, the present invention provides improved processors, data processing systems and methods for synchronizing updates to a shared memory utilizing load-reserve and store-conditional instructions. According to at least one embodiment, a processing unit includes a store-in lower level cache having reservation logic that determines presence or absence of a reservation and a processor core including a store-through upper level cache, an instruction execution unit, a load unit that, responsive to a hit in the upper level cache on a load-reserve operation generated through execution of a load-reserve instruction by the instruction execution unit, temporarily buffers a load target address of the load-reserve operation, and a flag indicating that the load-reserve operation bound to a value in the upper level cache. If a storage-modifying operation is received that conflicts with the load target address of the load-reserve operation, the processor core sets the flag to a particular state, and, responsive to execution of a store-conditional instruction, transmits an associated store-conditional operation to the lower level cache with a fail indication if the flag is set to the particular state.

BRIEF DESCRIPTION OF THE DRAWINGS

FIG. 2A is a flowchart of a conventional method of processing a load-reserve instruction;

FIG. 2B is a flowchart of a conventional method of processing a store-conditional instruction;

DETAILED DESCRIPTION OF ILLUSTRATIVE EMBODIMENT

Figure 3:
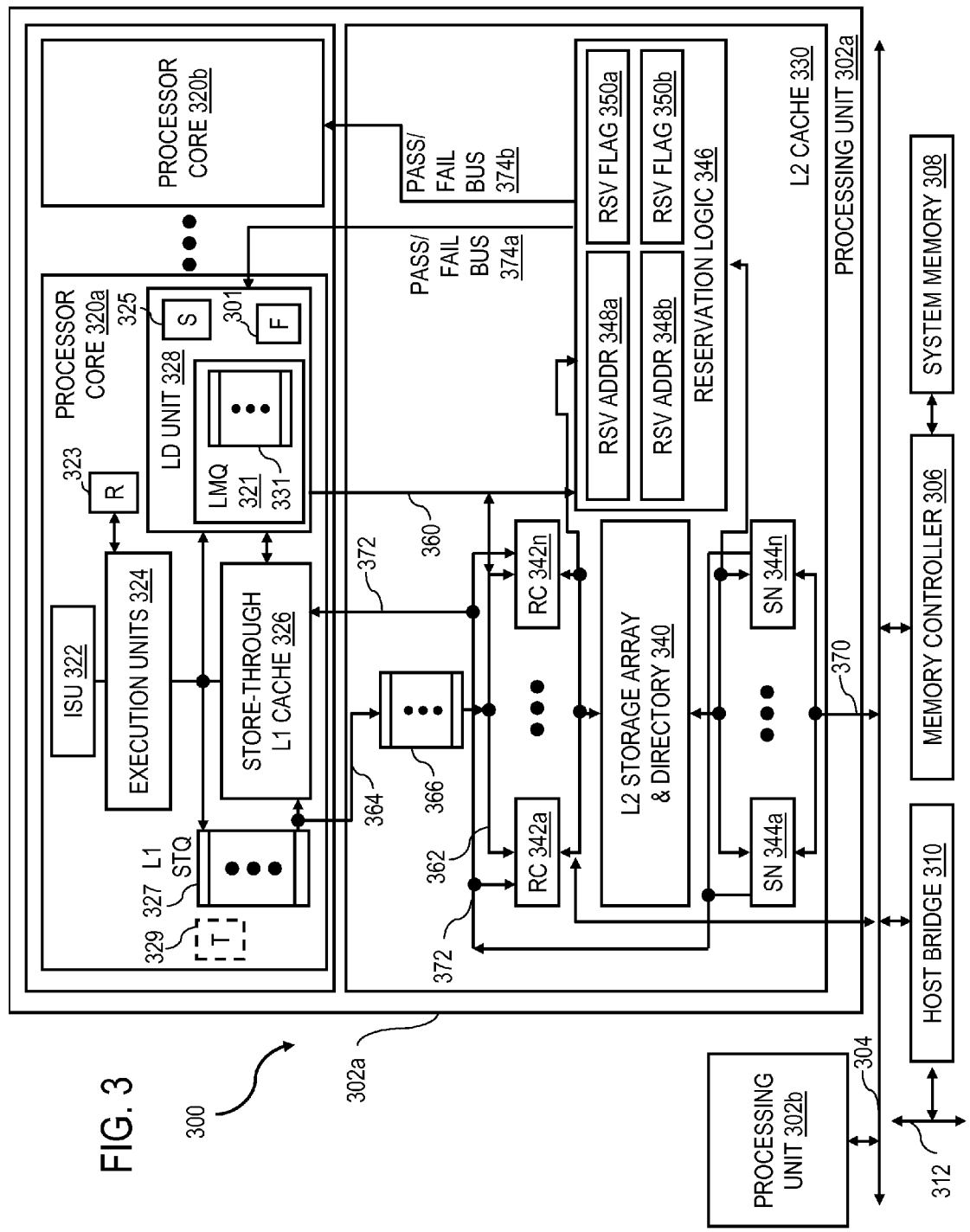
FIG. 3 is a high level block diagram of an illustrative data processing system in accordance with the present invention.

With reference again to the figures and in particular with reference to FIG. 3, there is illustrated a high level block diagram of an exemplary embodiment of a multiprocessor data processing system in accordance with the present invention. As shown, data processing system 300, which may be, for example, a server or workstation computer, includes multiple processing units 302a, 302b for processing data and instructions. Processing units 302 are coupled for communication to a system interconnect 304 for conveying address, data and control information between attached devices. The attached devices include not only processing units 302, but also a memory controller 306 providing an interface to a shared system memory 308 and one or more host bridges 310, each providing an interface to a respective mezzanine bus 312. Mezzanine bus 312 in turn provides slots for the attachment of additional unillustrated devices, which may include network interface cards, I/O adapters, non-volatile memory, non-volatile storage device adapters, additional bus bridges, etc.

As further illustrated in FIG. 3, each processing unit 302, which may be realized as a single integrated circuit, includes one or more processor cores 320a, 320b for processing instructions and data. Each processor core 320 includes execution units 324 for executing instructions and an instruction sequencing unit (ISU) 322 for fetching and ordering instructions for execution by the execution units 324. In accordance with the present invention, the instructions executed by execution units 324 include load-reserve and store-conditional instructions, which are utilized to synchronize access to shared memory between a particular thread of execution and other concurrent threads of execution, whether executing in the same processor core 320, a different processor core 320 in the same processing unit 302, or in a different processing unit 302. In a preferred embodiment, execution units 324 execute at least load-reserve and store-conditional instructions in-order (other instructions may or may not be executed out-of-order).

Each processor core 320 further includes an L1 store queue (STQ) 327 and a load unit 328 for managing the completion of store and load operations, respectively, corresponding to executed store and load instructions (including load-reserve and store-conditional instructions). In a preferred embodiment, L1 STQ 327 is implemented as a First-In, First-Out (FIFO) queue containing a plurality of queue entries. Store operations are accordingly loaded in the "top" entry of L1 STQ 327 at execution of the corresponding store instruction to determine the target address, and are initiated when the store operation reaches the "bottom" or "commit" entry of L1 STQ 327.

It is important to note that the present application makes a distinction between "instructions", such as load-reserve and store-conditional instructions, and "operations". Load and store "instructions" (including load-reserve and store-conditional instructions) are defined herein as inputs to an execution unit that include an operation code (opcode) identifying the type of instruction and one or more operands specifying data to be accessed and/or its address. Load and store "operations", including load-reserve and store-conditional operations, are defined herein as data and/or signals generated following instruction execution that specify the address of data to be accessed. Thus, load-reserve and store-conditional operations may be transmitted from a processor core 320 to lower level memory to initiate data accesses, while load-reserve and store-conditional instructions are not.

The operation of processor core 320 is supported by a multi-level volatile memory hierarchy having at its lowest level shared system memory 308, and at its upper levels two or more levels of cache memory, which in the illustrative embodiment include L1 cache 326 and L2 cache 330. In the particular embodiment shown in FIG. 3, L2 cache 330 is shared by all processor cores 320 within a processing unit 302. As in other shared memory MP data processing systems, the contents of the memory hierarchy may generally be accessed and modified by threads of execution executing in any processor core 320 in any processing unit 302 of data processing system 300.

In accordance with the present invention, L1 cache 326, which may include bifurcated L1 data and instruction caches, is implemented as a store-through cache, meaning that the point of cache coherency with respect to other processor cores 320 is located below L1 cache 326 and, in the depicted embodiment, is located at L2 cache 330. Accordingly, as described above, L1 cache 326 does not maintain true cache coherency states (e.g., Modified, Exclusive, Shared, Invalid) for its cache lines, but only maintains valid/invalid bits. Because L1 cache 326 is implemented as a store-through cache, store operations (including store-conditional operations) first complete relative to the associated processor core 120 in L1 cache 326 and then complete relative to other processing units 302 at a point of system-wide coherency, which in the depicted embodiment is L2 cache 330.

As further illustrated in FIG. 3, L2 cache 330 contains a storage array and directory 340 that store cache lines of instructions and data in association with their respective memory addresses. L2 cache 330 also includes a number of instances of read-claim (RC) logic 342a-342n for managing memory access operations received from the associated processor cores 320. RC logic instances 342a-342n receive load operations from LD unit 328 in processor core 320 via load bus 360 and command bus 362, and receive store operations from L1 STQ 327 in processor core 320 via store bus 364, an in-order L2 STQ 366, and command bus 362.

L2 cache 330 further includes a number of instances of snoop (SN) logic 344a-344n for managing memory access and other operations received from other processing units 302 via system interconnect 304 and snoop bus 370. Snoop logic instances 344 and RC logic instances 342 are each connected to a back-invalidation bus 372 by which any snoop logic instance 344 or RC logic instance 342 can signal the invalidation of a cache line to processor core 320.

L2 cache 330 finally includes reservation logic 346 for recording reservations of the associated processor core(s) 320. Specifically, reservation logic 346 includes, for each thread that may be concurrently executed by the processor core(s) 320 in its processing unit 302, a respective reservation register comprising a reservation address field 348 and a reservation flag 350. For example, in the depicted example, which assumes that processor cores 320a and 320b can each execute a single thread, reservation logic 346 includes two reservation registers: reservation address field 348a and reservation flag 350a for processor core 320a and reservation address field 348b and reservation flag 350b for processor core 320*b*. When set (e.g., to '1'), a reservation flag 350 indicates that the associated processor core 320 holds a reservation for the address contained in reservation address field 348 and otherwise indicates no reservation is held. Reservation logic 346 supplies pass/fail indications indicating the outcomes of store-conditional operations to processor cores 320*a*, 320*b* via respective pass/fail buses 374*a*, 374*b*.

In the depicted embodiment, load unit 328 of processor core 320 further includes a load miss queue (LMQ) 321 including a plurality of entries 331 for tracking load operations that miss in L1 cache 326 while such load operations are being serviced from cache memory in data processing system 300 or system memory 308. In accordance with a preferred embodiment and as described further below, LMQ 321 is also utilized to track a reservation request by processor core 320 until a successful handoff of responsibility for tracking the reservation to reservation logic 346 in L2 cache 330 (or until the reservation is canceled by an invalidating (e.g., storage-modifying) operation). The state of a reservation by a processor core 320 is indicated by a per-thread STCXF flag 301. The STCXF flag 301 is reset (e.g., to 0) to indicate an active reservation for the associated thread, and is set (e.g., to 1) to indicate the cancellation of the reservation for the associated thread.

Figure 4A:
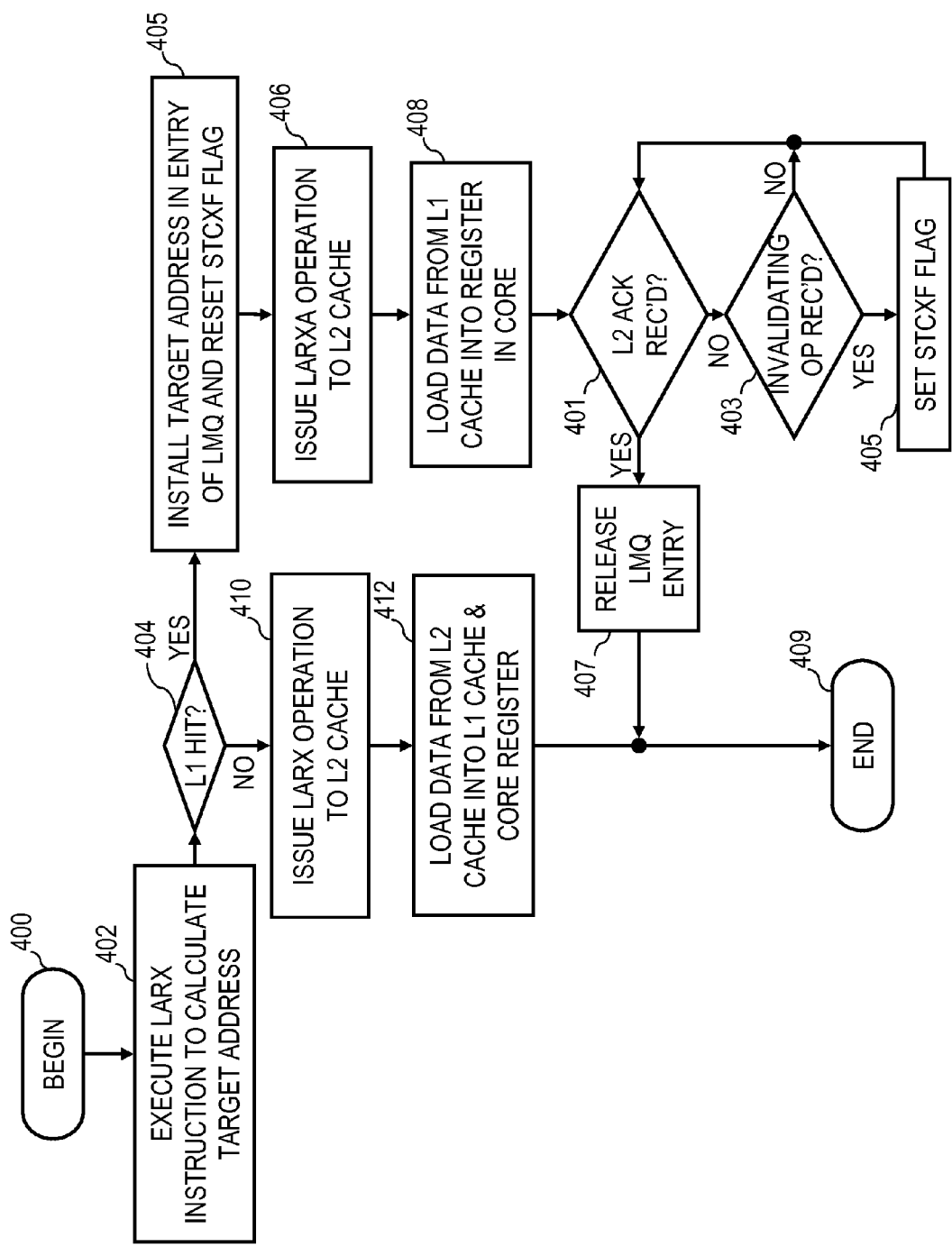
FIG. 4A is a high level logical flowchart of an exemplary method of processing a load-reserve instruction in a processor core in accordance with the present invention.

Referring now to FIG. 4A, there is depicted a high level logical flowchart of an exemplary method by which a processor core 320 of data processing system 300 processes a load-reserve instruction in accordance with the present invention. As shown, the process begins at block 400 and thereafter proceeds to block 402, which illustrates execution units 324 receiving a load-reserve instruction, referred to hereinafter as a LARX instruction, from ISU 322 and then executing the LARX instruction to calculate the load target address. In a preferred embodiment, execution units 324 execute LARX instructions within a hardware thread in-order and without pipelining, meaning that the data words(s) requested by a LARX instruction must be loaded to one or more registers 323 in processor core 320 before the next LARX instruction begins execution. These restrictions simplify the management of reservations by reservation logic 346 in L2 cache 330.

Following execution of the LARX instruction, the load target address is received from execution units 324 by LD unit 328. As illustrated at block 404, LD unit 328 then accesses the directory of L1 cache 326 to determine whether a cache line containing the data word(s) associated with the load target address resides in L1 cache 326. If not, L1 cache 326 signals a cache miss to LD unit 328, which responds by issuing a LARX operation to an RC logic instance 342 in L2 cache 330 via load bus 360 and command bus 362, as shown at block 410.

Next, at block 412, processor core 320 receives the requested cache line of data identified by the load target address from L2 cache 330. Processor core 320 loads the entire cache line of data within L1 cache 326 and transfers the data word(s) associated with the load target address in a core register 323. Thus, unlike prior art processors that only load the data word(s) associated with the load target address in core register(s) and do not cache the target cache line, processor core 320 of data processing system 300 establishes the target cache line in L1 cache 326 to permit subsequent loads, and particularly subsequent load-reserve operations, to hit in L1 cache 326. Thereafter, the process terminates at block 409.

Returning to block 404, in response to LD unit 328 determining that the load target address hit in L1 cache 326, LD unit 328 installs the load target address in an entry 331 of LMQ 321 and resets the STCXF flag 301 to indicate that the processor core 320 has a reservation for the target cache line identified by the load target address (block 405). In addition, LD unit 328 issues an address-only LARXA operation to an RC logic instance 342 of L2 cache 330 via load bus 360 and command bus 362 to inform L2 cache 330 that the load-reserve has bound to a (potentially stale) value in L1 cache 326. If processing unit 302 implements multiple processor cores 320 and/or processor core(s) 320 capable of executing multiple concurrent threads of execution, the LARXA operation preferably includes not only the load target address, but also the core ID and thread ID that executed the LARX instruction.

As shown at block 408, L1 cache 326 loads the data word(s) associated with the load target address into one or more core registers 323 associated with execution units 324. As indicated at blocks 401, following issuance of the LARXA operation LD unit 328 monitors for receipt of an Acknowledge (ACK) from reservation logic 346 of L2 cache 330 indicating that a reservation for the load target address has been established in reservation logic 346. In response to receipt of the ACK, LMQ 321 releases the entry 331 in LMQ 321 allocated to the load target address, and the process terminates at block 409.

Figure 1:
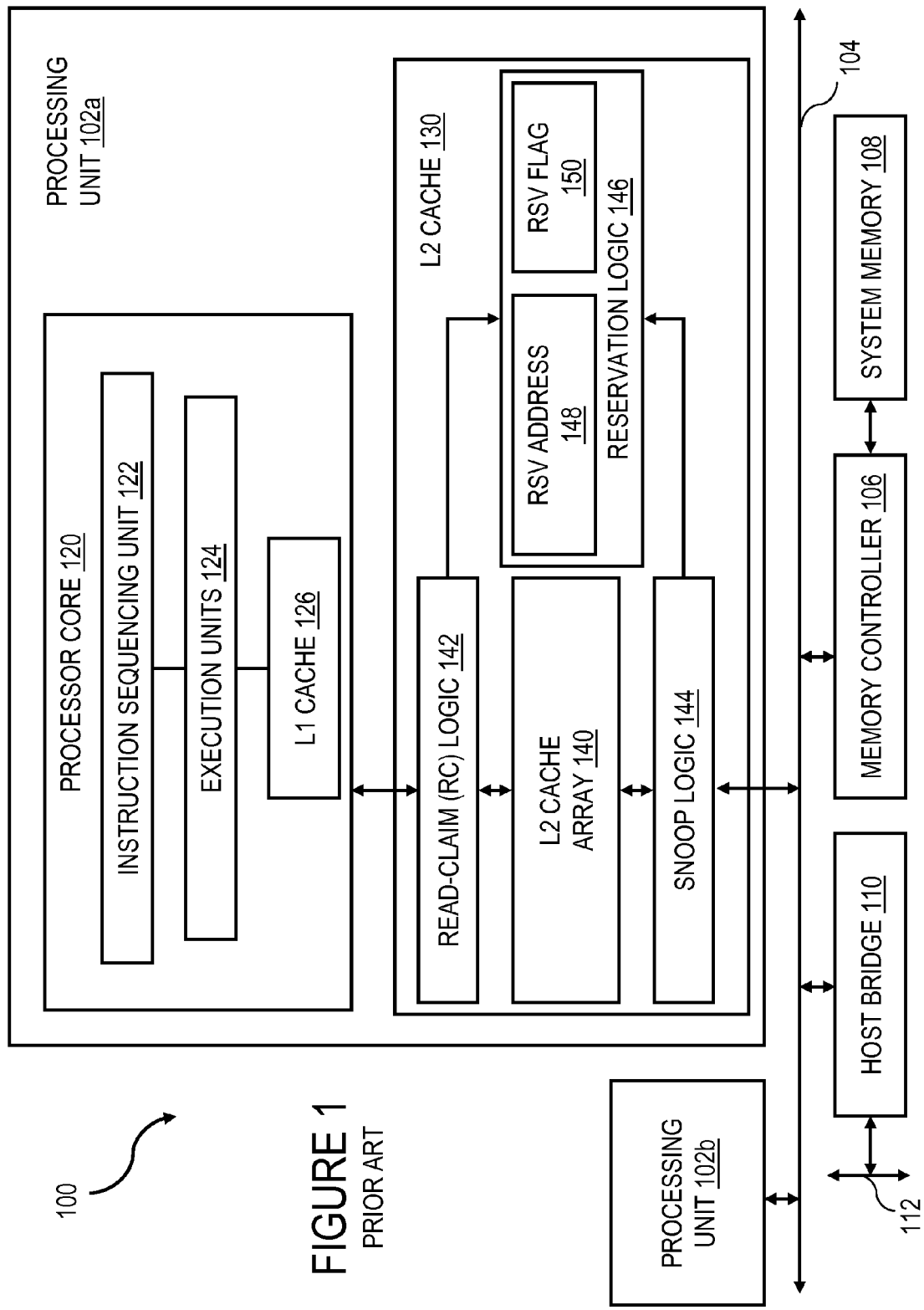
FIG. 1 is a high level block diagram of a conventional data processing system that utilizes load-reserve and store conditional instructions to update shared memory.
Figure 2C:
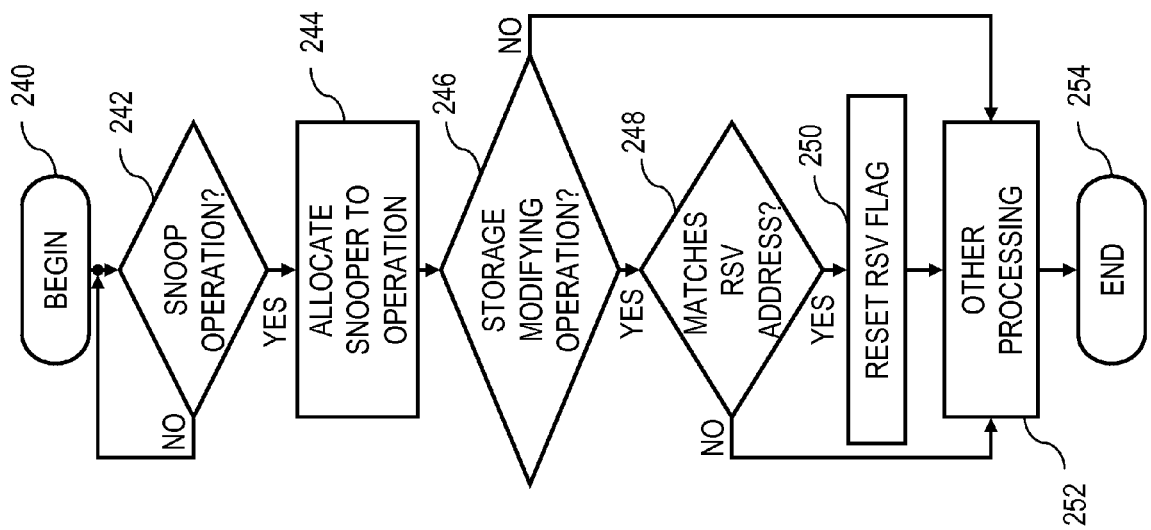
FIG. 2C is a flowchart of a conventional method of processing operations snooped on a system bus.

Referring again to block 401 and additionally to block 403, until the ACK is received from L2 cache 330, LD unit 328 monitors for receipt of an invalidating operation (e.g., invalidate or storage-modifying operation) from L2 cache 330, as described above with reference to block 252 of FIG. 2C. If an invalidating operation is received from L2 cache 330 in the time window between issuance of the LARXA operation and receipt of the ACK from L2 cache 330, then LD unit 328 sets STCX flag 301, as shown at block 405. Following block 405, the process returns to block 401, which has been described.

Figure 4B:
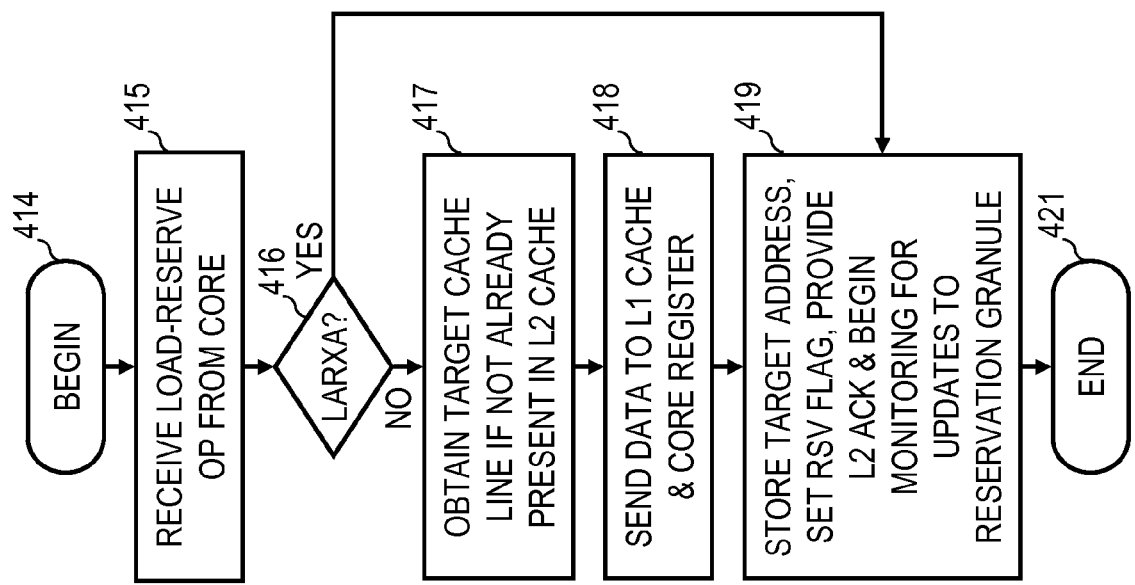
FIG. 4B is a high level logical flowchart of an exemplary method of processing a load-reserve operation in a lower level cache in accordance with the present invention.

Referring now to FIG. 4B, there is depicted a high level logical flowchart of an exemplary method by which an L2 cache 330 of data processing system 300 processes a load-reserve operation in accordance with the present invention. The process begins at block 414 and then proceeds to block 415, which depicts an RC logic instance 342 receiving a load-reserve operation from a processor core 320 to which it is directly connected. Next, at block 416, the RC logic instance 342 determines whether the load-reserve operation is a LARX operation or a LARXA operation, as discussed above with reference to FIG. 4A. If the load-reserve operation is a LARXA operation, the process proceeds to block 419, which is described below. If, however, the RC logic instance 342 determines at block 416 that the load-reserve operation is a LARX operation, the process passes to block 417.

Block 417 depicts RC logic instance 342 initiating access to L2 storage array and directory 340 and, if necessary, to another cache hierarchy or system memory 308 via system interconnect 304, to retrieve the target cache line of the LARX operation. Once the target cache line is obtained, RC logic instance 342 sends the target cache line to L1 cache 326 and to registers 323 (block 418). Next, as illustrated at block 419, the RC logic instance 342 establishes a reservation for the load target address in L2 cache 330 by placing the load target address in a reservation address field 348 and setting the associated reservation flag 350. In addition, reservation logic 346 begins monitoring for an indication that the reservation granule has been updated and provides an ACK to LD unit 328 to indicate that reservation logic 346 has assumed responsibility for tracking the reservation. The process thereafter ends at block 421.

Figure 4C:
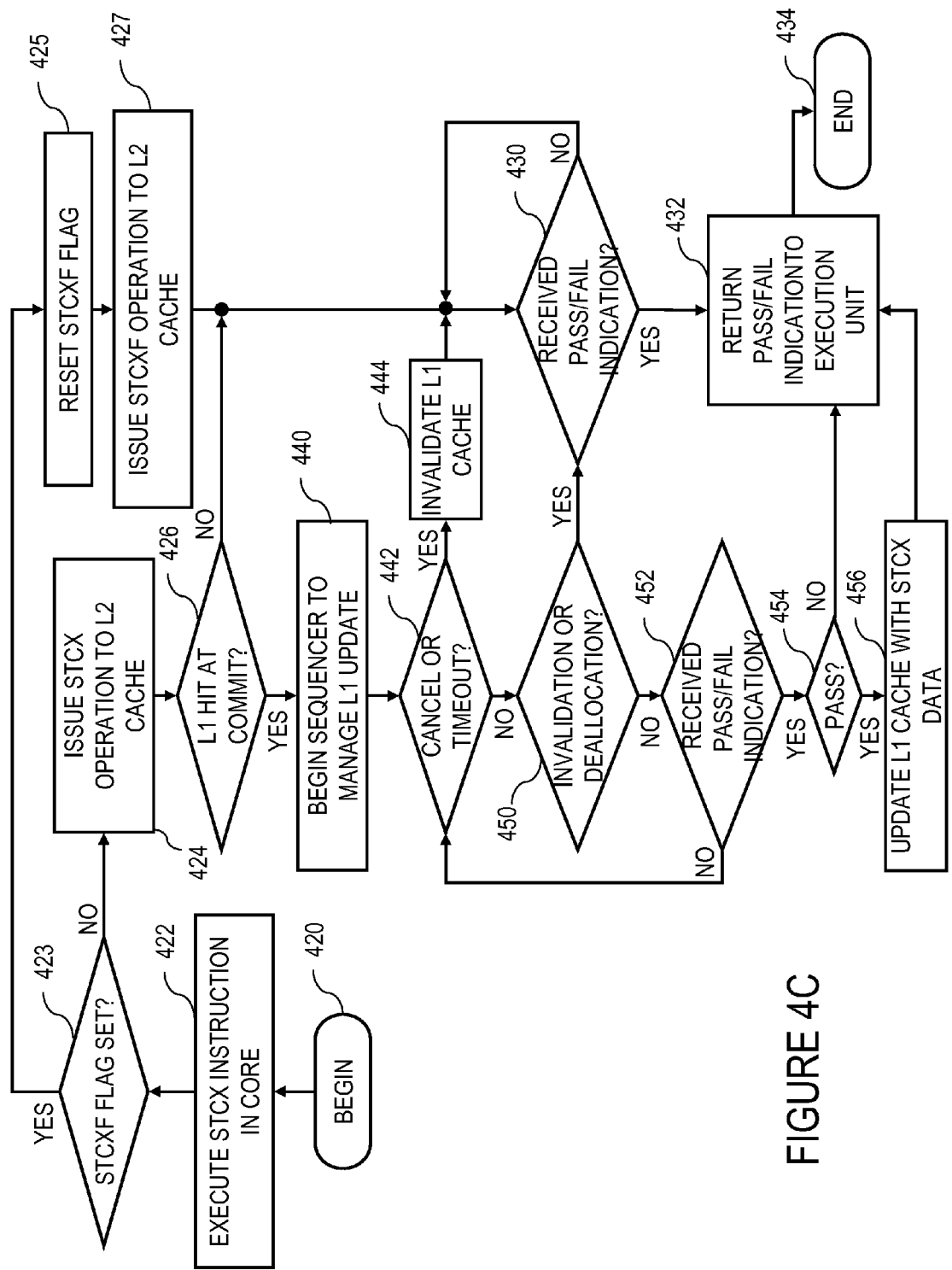
FIG. 4C is a high level logical flowchart of an exemplary method of processing a store-conditional instruction and corresponding store-conditional operation in a processor core in accordance with the present invention.

With reference now to FIG. 4C, there is illustrated a high level logical flowchart of an exemplary method of processing a store-conditional instruction in a processor core in accordance with the present invention. As depicted, the process begins at block 420 and thereafter proceeds to block 422, which illustrates execution units 324 receiving a store-conditional instruction, referred to hereinafter as a STCX instruction, from ISU 322 and then executing the STCX instruction to calculate the store target address. As with LARX execution described above, execution units 324 also preferably execute STCX instructions within the same hardware thread in-order and without pipelining. Upon execution of the STCX instruction, execution units 324 place a corresponding STCX operation including the store target address within L1 STQ 327, which is preferably implemented as a FIFO queue for buffering and ordering store operations of all threads executing within a processor unit 302.

When the STCX operation corresponding to the STCX instruction reaches the bottom or commit entry of L1 STQ 327, L1 STQ 327 determines at block 423 whether or not the associated STCXF flag 301 is set to indicate that a STCXF operation should be transmitted to L2 cache 330. In a preferred embodiment, a STCXF operation is a STCX operation having an accompanying fail flag indicating that the operation should receive a fail indication from L2 cache 330 and should not update store-through L1 cache 326. In response to a determination that the STCXF flag 301 is not set, the process proceeds from block 423 to block 424 and following blocks, which are described below. If, however, L1 STQ 327 determines at block 423 that the associated STCXF flags 301 is set, L1 STQ 327 resets the STCXF flag 301, as shown at block 425, and issues a STCXF operation to L2 cache 330 at block 427. Following block 427, the process passes to block 430, which is described below.

Referring now to block 424, if the STCX flag 301 is reset, L1 STQ 327 issues a STCX operation to L2 STQ 366 via store bus 364 when the STCX operation reaches the bottom (or "commit") entry of L1 STQ 327. In addition, as depicted at block 426, L1 STQ 327 determines, when the STCX operation reaches the commit entry of L1 STQ 327, whether the STCX operation hit in L1 cache 326. If the store target address misses in L1 cache 326 at the commit entry of L1 STQ 327, the process passes to block 430, which depicts L1 STQ 327 awaiting a pass/fail indication indicating whether or not the STCX operation succeeded at L2 cache 330 (i.e., with respect to all other threads and cache coherent processing units 302). In response to receipt of the pass/fail indication, processor core 320 provides the pass/fail indication to execution units 324 (e.g., to indicate whether the path of execution should change), as shown at block 432, but does not write to L1 cache 326. Thereafter, the STCX operation is deallocated from L1 STQ 327, and the process terminates at block 434.

Returning to block 426, in response to L1 STQ 327 determining that the store target address of the STCX operation hit in L1 cache 326 when the STCX operation reached the commit entry of L1 STQ 327, the process proceeds to block 440. Block 440 illustrates L1 STQ 327 initiating sequencer logic 325 to manage the conditional update to L1 cache 326. That is, because the success of the STCX operation is conditioned on the absence of other store operations to the same reservation granule following the point in time that the associated LARX operation binds to a value, the store data of the STCX operation cannot be placed in the L1 cache until the L2 has processed the STCX operation and ensured that it has completed successfully system-wide.

As noted above, L1 STQ 327 is preferably implemented as a FIFO queue, meaning that until the STCX operation in the bottom or "commit" entry of L1 STQ 327 has finished and written to L1 cache 326 (if necessary), L1 STQ 327 is blocked and other store operations cannot make forward progress. In order to avoid a potential deadlock and/or performance degradation, sequencer logic 325 of L1 STQ 327 preferably implements at least one mechanism by which sequencer logic 325 can discontinue waiting for the pass/fail indication from L2 cache 330 in order to update L1 cache 326 and can instead invalidate the target cache line in L1 cache 326.

In a preferred embodiment, sequencer logic 325 of L1 STQ 327 implements two "escape" mechanisms to cause sequencer logic 325 to stop waiting for the pass/fail indication from L2 cache 330 in order to update L1 cache 326. The first of these mechanism is a respective cancel (or latency) signal from L2 cache 330 for each processor core 320 and thread that, when asserted, indicates that L2 cache 330 is likely to delay returning the pass/fail indication (e.g., because of an L2 cache miss, the target cache line is held in Shared state, etc.). As shown at blocks 442 and 444, when sequencer logic 325 of L1 STQ 327 receives the cancel (latency) signal, sequencer logic 325 of L1 STQ 327 invalidates the target cache line in L1 cache 326 if the target cache line is still valid.

The other mechanism by which sequencer logic 325 can abandon the update to L1 cache 326 is an optional timeout counter (T) 329. If implemented, L1 STQ 327 starts timeout counter 329 in response to issuance of a STCX operation to L2 cache 330, and in response to a predetermined, programmable number of cycles elapsing prior to receipt of a pass/fail indication from L2 cache 330 (as indicated by a latency signal generated by timeout counter 329), sequencer logic 325 similarly invalidates the target cache line in L1 cache 326, as shown at block 442 and 444. By abandoning the writeback of the store data to L1 cache 326 in this manner, L1 STQ 327 can continue to make forward progress on other store operations. The process thereafter proceeds from block 444 to block 430, which has been described.

Still referring to FIG. 4C, following a determination at block 442 that no cancel signal has been received from L2 cache 330 and no timeout has occurred, the process passes to block 450. Block 450 illustrates L1 STQ 327 determining whether L1 cache 326 has deallocated the target cache line of the STCX operation or has invalidated the target cache line of the STCX operation, for example, in response to receipt of a back-invalidate signal on back-invalidation bus 372. If so, the process passes to block 430, which has been described. If not, L1 STQ 327 determines whether a pass/fail indication has been received from L2 cache 330 via pass/fail bus 374. If not, the process returns to block 442, representing sequencer logic 325 of L1 STQ 327 waiting until a pass/fail signal or cancel signal is received or a timeout, invalidation or deallocation occurs. In response to a determination at block 452 that a pass/fail indication has been received, sequencer logic 325 of L1 STQ 327 takes the appropriate action. Namely, if the pass/fail indication is a fail indication, the process passes to block 432, which has been described. If, on the other hand, the pass/fail indication is a pass indication, sequencer logic 325 of L1 STQ 327 updates L1 cache 326 with the store data from the STCX operation, as depicted at block 456. Thereafter, the process passes to block 432, which has been described.

Figure 4D:
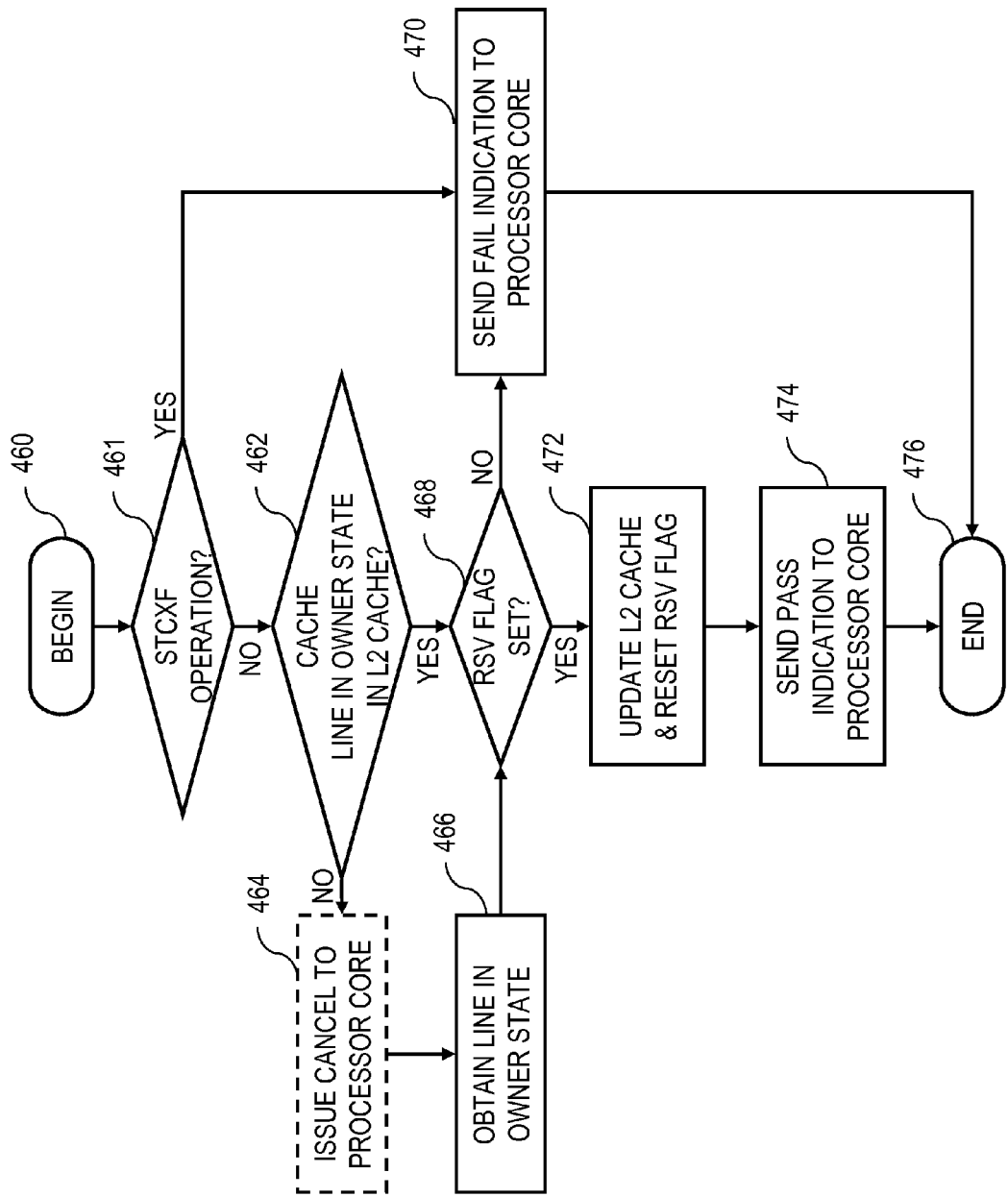
FIG. 4D is a high level logical flowchart of an exemplary method of processing a store-conditional operation in lower level cache in accordance with the present invention.

Referring now to FIG. 4D, there is depicted a high level logical flowchart of an exemplary method of processing a store-conditional operation in lower level cache in accordance with the present invention. As described above, store-conditional operations are received by L2 cache 330 within L2 STQ 366 via store bus 364. L2 STQ 366, like L1 STQ 327, may be implemented as a FIFO queue. Store operations, including STCX operations, pass from the bottom entry of L2 STQ 366 to RC logic instances 342 for processing.

In response to receipt of a STCXF operation, an RC logic instance 342 determines at block 461 whether or not the received operation is a STCXF operation. If not, the process passes to block 462 and following blocks, which are described below. If, however, the RC logic instance 342 detects the store-conditional operation contains a fail flag signifying a STCXF operation, the RC logic instance 342 notifies reservation logic 346, which sends a fail indication to the appropriate processor core 320 (with a thread identifier, if the processor core 320 is multi-threaded), as shown at block 470. As described above, the fail indication causes the conditional storage update indicated by the STCX instruction to not be performed. Following block 470, the process ends at block 476.

As shown at block 462, when processing a STCX operation, an RC logic instance 342 determines by reference to the L2 directory within storage array and directory 340 whether or not L2 cache 330 holds the target cache line in an "owner" cache state, such as Modified or Exclusive, in which the target cache line can be updated without first obtaining modification ("owner") rights from another processing unit 302. If not, the RC logic instance 342 optionally issues a cancel signal to the processor core 320, as shown at block 464, to indicate that L1 STQ 327 should abandon the STCX update to L1 cache 326. In addition, RC logic instance 342 obtains the target cache line in an "owner" state, for example, by issuing a read-with-intent-to-modify transaction on system interconnect 304. The process shown in FIG. 4D then proceeds to block 468.

Block 468 illustrates the RC logic instance 342 determining whether or not a reservation flag 350 for the store target address is set (i.e., whether or not any other processing core 320 or thread has modified the reservation granule). If not, reservation logic 346 transmits a fail indication to processor core 320 via pass/fail bus 374, as shown at block 470. Thereafter, the process terminates at block 476. If, on the other hand, a determination is made at block 468 that reservation flag 350 is still set, indicating that no other processor core 320 or thread has modified the reservation granule since the reservation was established, RC logic instance 342 updates the L2 cache array within storage array and directory 340 with the store data of the STCX operation and resets reservation flag 350, as shown at block 472. Reservation logic 346 also sends a pass indication to processor core 320 at block 474. Thereafter, the process ends at block 476.

Reservations set in accordance with FIGS. 4A-4B can be canceled (i.e., reset) by an L2 cache 330 in response to snooping storage-modifying operations on system interconnect 304, as described above with reference to FIG. 2C. It should be noted that in embodiments of the present invention in which multiple processor cores 320 share an L2 cache 330, as shown in FIG. 3, reservations established by LARX and LARXA operations by processor core 320a can be canceled (i.e., reset) not only by storage-modifying operations snooped by L2 cache 330 on system interconnect 304, but also by storage-modifying operations by another processor core 320b sharing L2 cache 330. In such embodiments, the RC logic instance 342 receiving the storage-modifying operation from processor core 320b performs the steps depicted in FIG. 2C in the same manner described above, as well as the storage update specified by the storage-modifying operation.

Figure 5A:
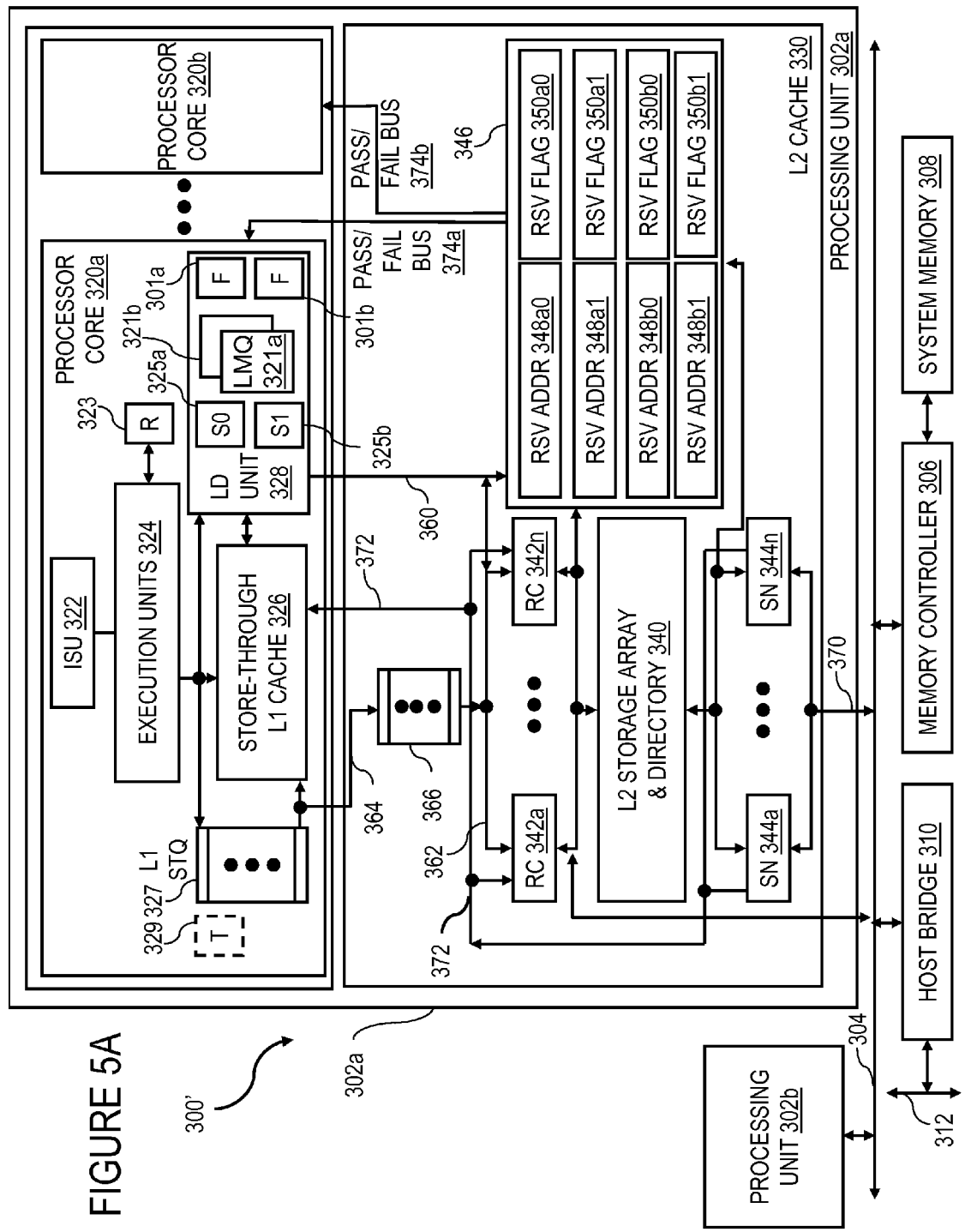
FIG. 5A is a high level block diagram of an exemplary multiprocessor data processing system having processor cores that support multiple concurrent, hardware-managed threads in accordance with one embodiment of the present invention.

With reference now to FIG. 5A, there is illustrated a data processing system 300' in which one or more processor cores 320 support multiple, concurrent hardware-managed threads of execution. As indicated by prime notation (') and the use of like reference numerals, data processing system 300' is similar to data processing system 300 described above, with some modifications to support multi-threading. In particular, reservation logic 346 has been expanded to include a respective reservation register for each concurrent hardware-managed thread supported by the associated processor cores 320. For example, in the illustrated embodiment in which each of processing cores 320a, 320b supports up to two concurrent hardware-managed threads of execution, reservation logic 346 contains reservation address field 348a0 and reservation flag 350a0 for thread0 of processor core 320a, reservation address field 348a1 and reservation flag 350a1 for thread1 of processor core 320a, reservation address field 348b0 and reservation flag 350b0 for thread0 of processor core 320b, and reservation address field 348b0 and reservation flag 350b1 for thread1 of processor core 320b.

As further illustrated in FIG. 5A, the LD unit 328 of each processor core 320 is expanded to include a respective LMQ 321a, 321b, a respective STCXF flag 301a, 301b and a respective instance of sequencer logic 325a, 325b for each concurrent hardware-managed thread. As described below, sequencer logic instances 325a, 325b coordinate load-reserve and store-conditional operations between threads in the same processor core 320 to ensure that memory updates performed by one thread will cause a conflicting STCX operation by the other thread to fail. Thus, a multi-threaded processor core 320 must account for at least three sources of storage-modifying operations that must cause a STCX operation to fail: (1) other processing units 302, (2) other processor core(s) 320 in the same processing unit 302, and now (3) other concurrent hardware-managed thread(s) executing in the same processor core 320.

It should be noted that in a multi-threaded embodiment, processor core 320a of data processing system 300' retains a single L1 STQ 327 that orders store operations not only within the same hardware-managed threads, but also across all hardware-managed threads. Advantageously, processing of load-reserve and store-conditional instructions and the associated load-reserve and store-condition operations in a data processing system 300' having multi-threaded processor cores 320 is performed in accordance with FIGS. 4A-4D described above.

Figure 5B:
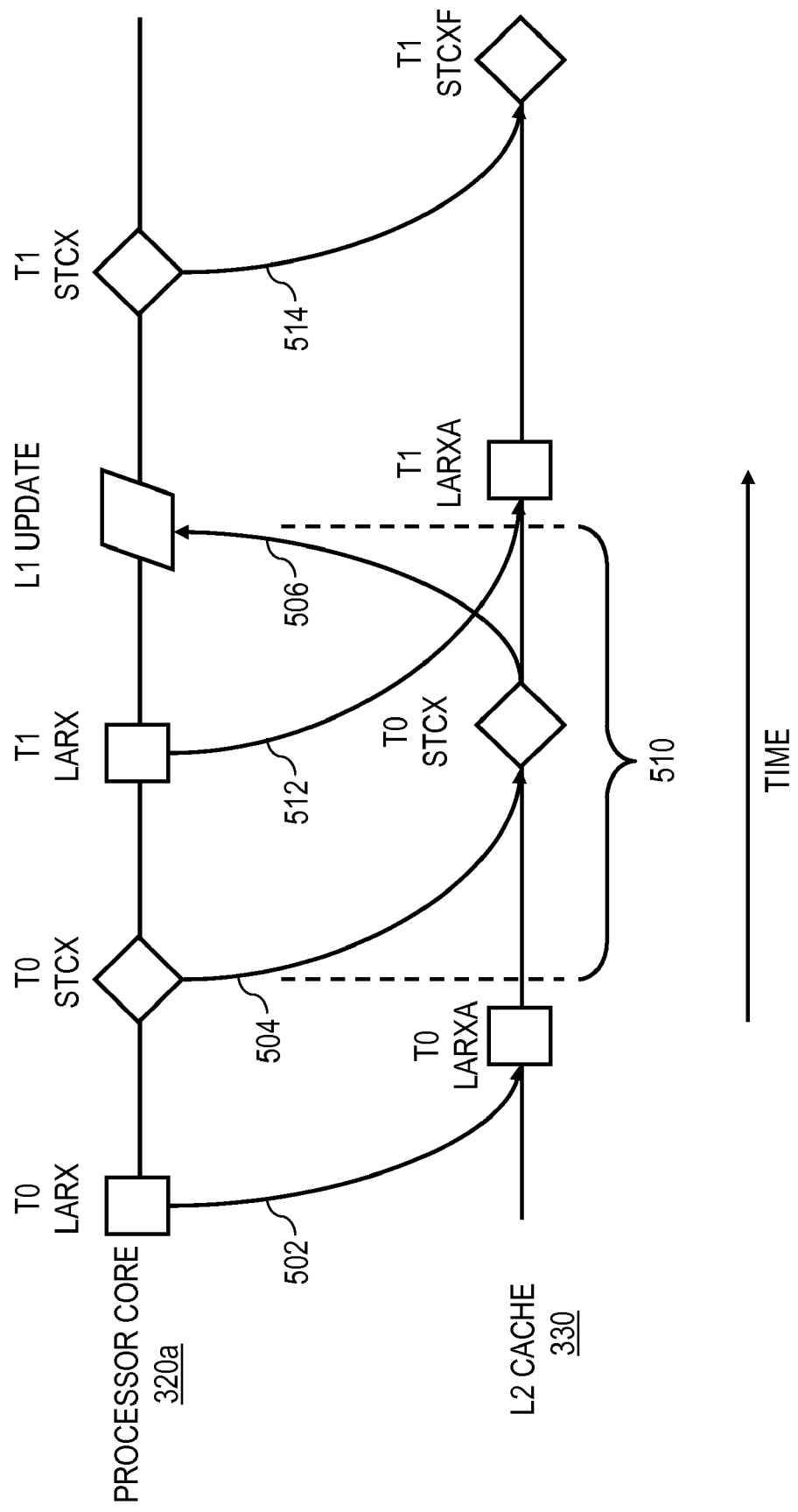
FIG. 5B is a time-space diagram depicting a reservation hazard window in which a storage-modifying operation of one hardware-managed thread may conflict with a load-reserve operation of another concurrent hardware-managed thread executing within the same processor core.

Referring now to FIG. 5B, there is depicted a time-space diagram illustrating a reservation hazard window in which a storage-modifying operation of one hardware-managed thread may conflict with a load-reserve operation of another concurrent hardware-managed thread executing within the same processor core 320 of data processing system 300'. In the depicted operating scenario, thread0 (T0) of a processor core 320a first executes a load-reserve instruction that binds in store-through L1 cache 326 and accordingly causes a corresponding LARXA operation to be sent to L2 cache 330 to establish a reservation for a reservation granule containing the load target address, as shown at reference numeral 502 and as previously described with respect to block 406 of FIG. 4A. Subsequently, in response to execution of a store-conditional instruction within the same thread0, processor core 320a transmits a STCX operation 504 to L2 cache 330 to resolve whether or not the conditional update to storage indicated by the store-conditional instruction should be performed in store-through L1 cache 326. As described above, the load-reserve and store-conditional instructions are executed within thread0 in-order and without pipelining. No update to store-through L1 cache 326 is made in response to the execution of the store-conditional instruction unless and until a pass indication 506 is received from L2 cache 330 indicating that the STCX operation succeeded.

As shown in FIG. 5B, the issuance of STCX operation 504 from processor core 320a initiates a reservation hazard window 510 that closes when store-through L1 cache 326 is updated (or not) in response to the pass/fail indication received by processor core 320a from L2 cache 330. Any store-conditional operation associated with a "conflicting" load-reserve operation of thread1 of processor core 320*a* during reservation hazard window 510 (e.g., LARXA operation 512) is required to fail if STCX operation 504 of thread0 receives a pass indication from L2 cache 330 because the value obtained by the load-reserve operation may be superseded by the data written into L1 cache 326 by STCX operation 504. As will appreciated by those skilled in the art, various implementations of the present invention may apply different precision to the definition of what load-reserve operations are deemed to be "conflicting." For example, some implementations assume that a load-reserve operation conflicts with an earlier store-conditional operation if the load-reserve operation targets the same cache line in store-through L1 cache 326. Of course, other address granularities can be utilized in determining a conflict, including, for example, the L2 reservation granule size or 4-byte words.

In order to ensure that, if necessary, the store-conditional operation of thread1 fails, sequencer logic instance S1 325*b* manages the state of a respective flag 301*b* in the manner described below with reference to FIG. 5C so that, when set, flag 301*b* causes a subsequent STCX operation 514 to issue from L1 STQ 327 with a fail indication (an operation referred to herein as a "STCXF" operation). As described above, STCXF operation 514 forces L2 cache 330 to return a fail indication for STCX operation 514, thus preventing an update to store-through L1 cache 326. It should be noted that the transmission of ACKs from L2 cache 330 to processor core 320*a* (as described above with reference to block 419) is omitted from FIG. 5B in order to avoid unnecessarily obscuring the sequencing of load-reserve and store-conditional operations described above.

Figure 5C:
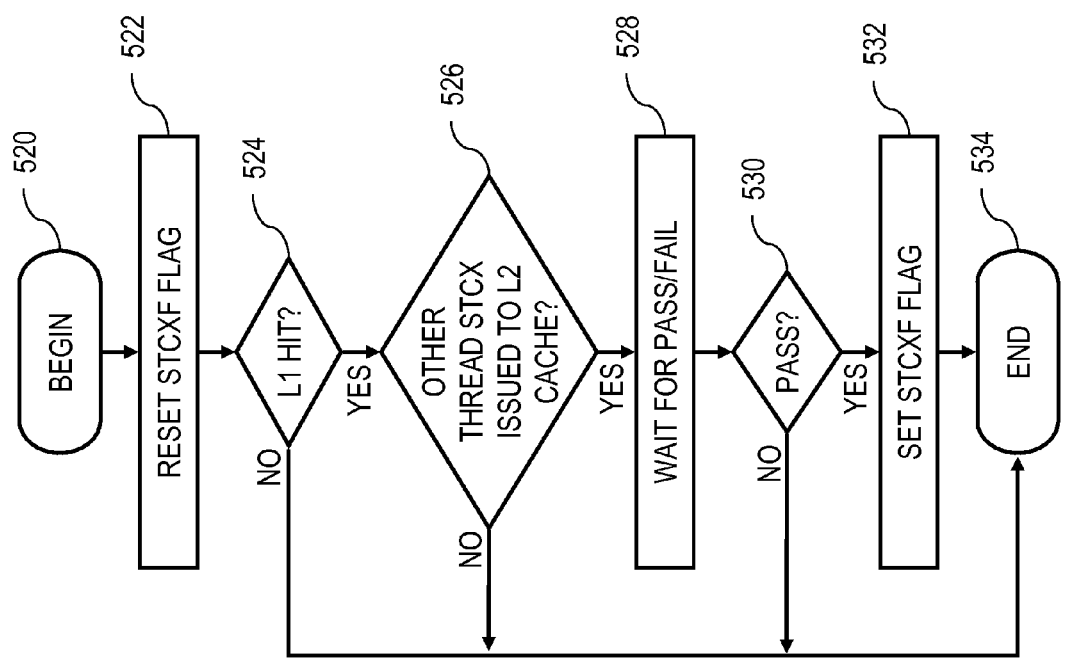
FIG. 5C is a high level logical flowchart of an exemplary method by which an instance of sequencer logic manages a STCXF flag in a multi-threaded processor core in accordance with one embodiment of the present invention.

With reference now to FIG. 5C, there is illustrated a high level logical flowchart of an exemplary method of operation of a sequencer logic instance 325 in accordance with one embodiment of the present invention. In the described embodiment, each processor core 320 implements a respective STCXF flag 301*a*, 301*b* for each supported concurrent hardware-managed thread, and the process will be described with respect to sequencer logic instance 325*b* and flag 301*b*.

As depicted, the process begins at block 520 in response to receipt of a load-reserve operation of thread1 by LD unit 328 and thereafter proceeds to block 522, which illustrates sequencer logic instance 325*b* resetting its respective STCXF flag 301*b*. In the reset state, STCXF flag 301*b* indicates that a STCXF operation should not be issued. When LD unit 328 accesses store-through L1 cache 326 as shown at block 404 of FIG. 4A, sequencer logic instance 325*b* receives an indication of whether or not a cache line containing the load target address resides in store-through L1 cache 326 (i.e., whether or not a cache hit occurred), as indicated at block 524. If the load target address missed in L1 store-through cache 326, LD unit 328 issues a LARX operation to L2 cache 330, as described above with respect to block 410 of FIG. 4A, and sequencer logic instance 325*b* returns to an idle state, as shown at block 534.

If, however, the load target address hit in L1 cache 326, LD unit 328 transmits a LARXA operation to L2 cache 330, as depicted at block 406 of FIG. 4A, and sequencer logic instance 325*b* receives a hit indication at block 524. In response to the hit indication, sequencer logic instance 325*b* determines at block 526 whether the other thread (thread0) has a STCX operation in the commit entry of L1 STQ 327 (e.g., STCX operation 504) that has been issued to L2 cache 330. This determination may be made, for example, by examining the operation in the commit entry of L1 STQ 327 and the state of a 1-bit thread identifier that preferably accompanies each store operation throughout the processing unit 302. If a STCX operation from thread0 does not reside in the commit entry of L1 STQ 327, sequencer logic instance 325*b* returns to an idle state, as shown at block 534. If, however, sequencer logic instance 325*b* determines at block 526 that a STCX operation from thread0 resides in the commit entry of L1 STQ 327, sequencer logic instance 325*b* waits for the return of the pass/fail indication (e.g., pass/fail indication 506) for the STCX operation, as depicted at block 528.

If the STCX operation receives a fail indication as tested at block 530, sequencer logic instance 325*b* returns to an idle state, as shown at block 534. If, however, the STCX operation of thread0 receives a pass indication, meaning that any STCX to the load target address of the LARXA of thread1 will fail, sequencer logic instance 325*b* sets STCXF flag 301*b* at block 532. Thereafter, sequencer logic instance 325*b* returns to an idle state at block 534.

Figure 6A:
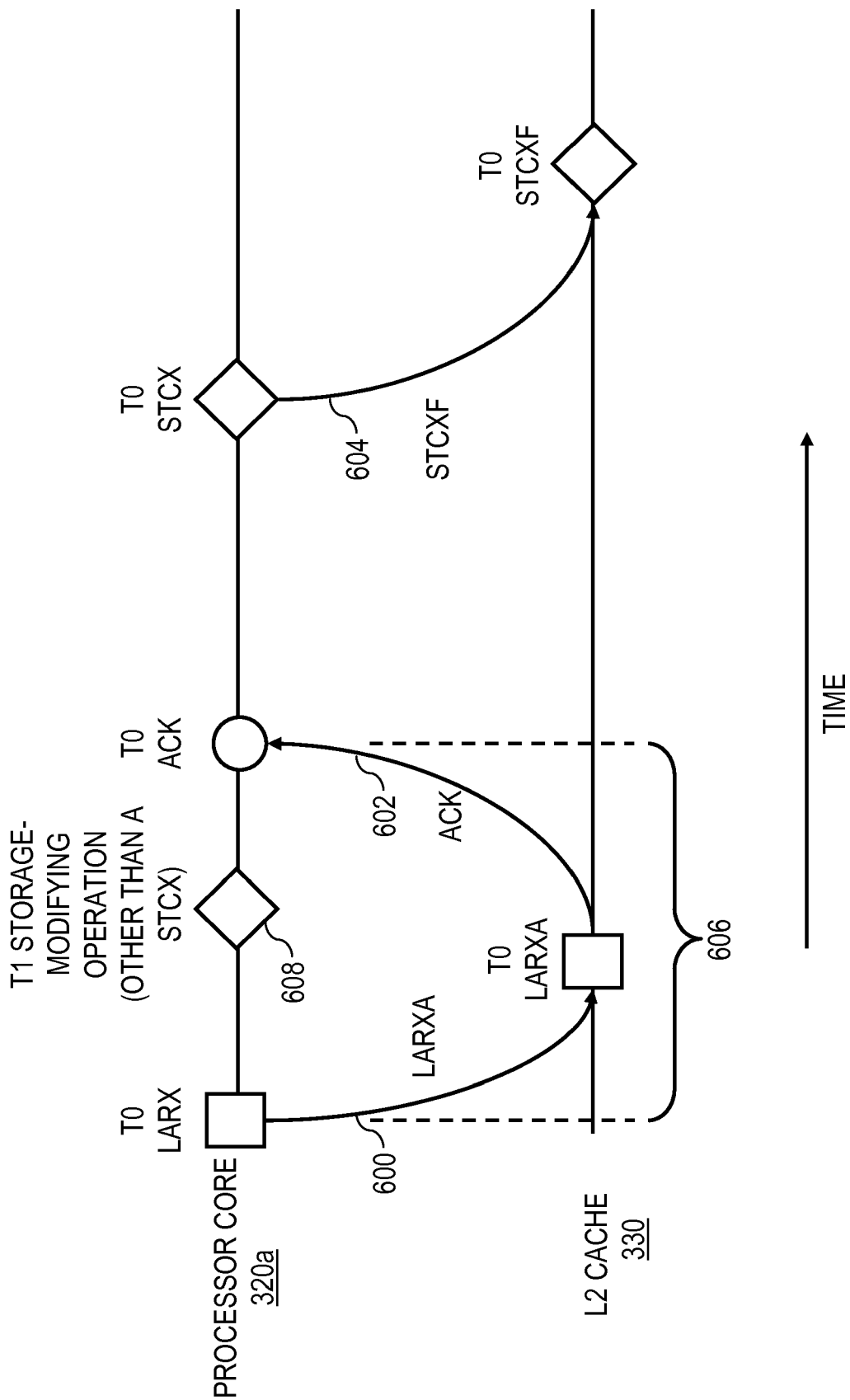
FIG. 6A is a time-space diagram depicting a reservation hazard window in which a storage-modifying operation other than a store-conditional operation may conflict with a load-reserve operation of a hardware-managed thread.

Referring now to FIG. 6A, there is depicted a time-space diagram depicting a reservation hazard window in which a storage-modifying operation other than a store-conditional operation may conflict with a load-reserve operation of a hardware-managed thread. In the depicted operating scenario, thread0 (T0) of a processor core 320*a* first executes a load-reserve instruction that binds in store-through L1 cache 326 and accordingly causes a corresponding LARXA operation to be sent to L2 cache 330 to establish a reservation for a reservation granule containing the load target address, as shown at reference numeral 600 and as previously described with respect to block 406 of FIG. 4A.

In response to receipt of LARXA operation 600, reservation logic 346 of L2 cache 330 provides an ACK signal 602 to processor core 320*a* to indicate that a reservation for the load target address has been established in reservation address register 348*a*0, reservation flag 350*a*0 has been set, and reservation logic 346 has assumed responsibility for monitoring for operations that cancel the reservation, as described above with reference to block 419 of FIG. 4B. Subsequently, in response to execution of a store-conditional instruction within the same thread0, processor core 320*a* transmits a store-conditional operation 604 to L2 cache 330 to resolve system-wide whether or not the conditional update to storage indicated by the store-conditional instruction should be performed in store-through L1 cache 326. As described above, the load-reserve and store-conditional instructions are executed within thread0 in-order and without pipelining. No update to store-through L1 cache 326 is made in response to the execution of the store-conditional instruction unless and until a pass indication 506 is received from L2 cache 330 indicating that store-conditional operation 604 succeeded.

As further shown in FIG. 6A, the issuance of LARXA operation 600 from processor core 320*a* initiates a reservation hazard window 606 that closes when reservation logic 346 of L2 cache 330 indicates to processor core 320*a* via ACK signal 602 that reservation logic 346 has assumed responsibility for tracking the reservation. Any storage-modifying operation other than a STCX, whether originated by the another thread of the same processor core 320*a* or another processor core 320 of data processing system 300', that "conflicts" with the reserved load target address and that is observed by processing unit 302*a* during reservation hazard window 606 is required to cancel the reservation. For storage-modifying operations originated by another processor core 320 in data processing system 300', cancellation of the reservation during reservation hazard window 606 is handled as described above with reference to blocks 403 and 405 of FIG. 4A. However, an additional mechanism is needed to handle such conflicts when the conflicting storage-modifying operation is originated by another hardware-managed thread (e.g., thread1) of the same processor core 320a. Thus, in the example of FIG. 6A, storage-modifying operation 608 of thread1 of processor core 320a, which conflicts with the reserved load target address of the prior LARX of thread0, is required to cancel the reservation established by the prior LARX.

In order to ensure that the reservation requested by LARXA 600 is canceled, L1 STQ 327 manages the state of STCXF flag 301a in the manner described below with reference to FIG. 6B so that, when set, STCXF flag 301a causes store-conditional operation 604 to issue from L1 STQ 327 with a fail indication (i.e., as a STCXF operation). As described above, STCXF operation 604 forces L2 cache 330 to return a fail indication for STCXF operation 604, thus preventing an update to store-through L1 cache 326 by the associated STCX instruction.

Figure 6B:
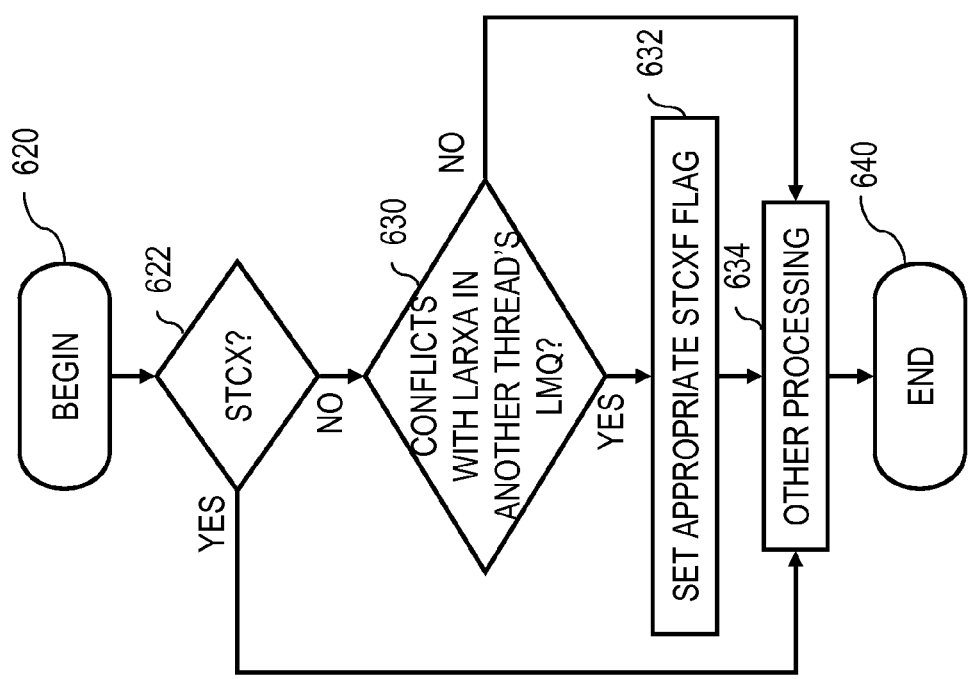
FIG. 6B is a high level logical flowchart of an exemplary method by which an L1 STQ manages a STCXF flag in a multi-threaded processor core in accordance with one embodiment of the present invention.

With reference now to FIG. 6B, there is illustrated a high level logical flowchart of an exemplary method by which L1 STQ 327 manages a STCXF flag 301 (hereafter assumed to be STCXF flag 301a) in a multi-threaded processor core in accordance with one embodiment of the present invention. The process begins at block 620 in response to an storage-modifying operation in L1 STQ 327 advancing to the "commit" or bottom entry of L1 STQ 327. L1 STQ 327 then determines at block 622 whether or not the storage-modifying operation is a STCX operation. If so, the process proceeds to block 634, which illustrates L1 STQ 327 performing other processing for the STCX operation, as has been previously described. Thereafter, the STCX operation is removed from L1 STQ 327, and the process ends at block 640.

Returning to block 622, if L1 STQ 327 determines that the storage-modifying operation at the commit entry is not a STCX operation, then the process passes to block 630. Block 630 depicts L1 STQ 327 determining whether or not the store target address specified by the storage-modifying operation conflicts with the load target address in the LMQ 321 of another hardware-managed thread of the same processor core 320a (e.g., LMQ 321a of thread0). If not, then the storage-modifying operation does not pose a reservation hazard during a reservation hazard window 606. Accordingly L1 STQ 327 performs other conventional processing for the storage-modifying operation, as illustrated at block 634. Thereafter, the storage-modifying operation is removed from L1 STQ 327, and the process ends at block 640.

Referring again to block 630, in response to L1 STQ 327 determining that the store target address specified by the storage-modifying operation conflicts with the load target address of a LARXA in the LMQ 321 of another hardware-managed thread of the same processor core 320a (e.g., LMQ 321a of thread0, which is processing a LARXA), then a reservation hazard is detected. Accordingly, L1 STQ 327 sets the STCXF flag 301 of the other thread (e.g., STCXF flag 321a of thread0) to cancel the reservation of that other thread and guarantee failure of a subsequent STCX operation to the reserved load target address. As noted above with reference to block 427, when STCXF flag 301a is set, thread0 issues a STCXF operation 604 rather than a STCX operation to guarantee that the conditional-store will receive a fail indication at block 470 of FIG. 4D. Following block 632, L1 STQ 327 performs other conventional processing for the storage-modifying operation, as illustrated at block 634. Thereafter, the storage-modifying operation is removed from L1 STQ 327, and the process ends at block 640.

As has been described, the present invention provides improved processing units, data processing systems, and methods for synchronizing updates to shared memory utilizing load-reserve and store-conditional instructions. In accordance with one aspect of the present invention, load-reserve operations are permitted to bind to possibly stale values in the L1 cache prior to determining whether the values are stale. If it is determined that the value to which the load-reserve operation bound in the L1 cache is stale, a subsequent store-conditional operation to the same reservation granule fails. If the value is determined to not be stale, the subsequent store-conditional operation succeeds, and the cache line containing the value to which the load-reserve operation bound is advantageously retained in the L1 cache.

In another aspect, the present invention supports load-reserve operations to bind in the L1 cache in the presence of concurrent, hardware-managed multi-threading. To provide such support, the processor core includes sequencer logic that detects a load-reserve operation of one thread within the reservation hazard window defined by a store-conditional operation of another thread and associated pass/fail indication. When such a load-reserve operation is detected, the processor core ensures that any associated store-conditional operation to a matching address fails if the store-conditional operation of the other thread succeeds.

While the invention has been particularly shown as described with reference to a preferred embodiment, it will be understood by those skilled in the art that various changes in form and detail may be made therein without departing from the spirit and scope of the invention. For example, although the invention has been described with reference to a particular embodiment of a memory hierarchy in which L1 and L2 caches are incorporated within a processing unit, those skilled in the art will appreciate that additional levels of in-line or lookaside caches may be employed and that, in some embodiments of the invention, one or more levels of cache may be off chip.

What is claimed is:

1. A method of data processing in a multi-processor data processing system including a processor core supported by a store-though upper level cache, the data processing system further including a store-in lower level cache and a system memory, said method comprising:

the processor core executing a load-reserve instruction to determine a load target address of a load-reserve operation;

responsive to the load target address hitting in the store-through upper level cache, temporarily buffering in the processor core the load target address;

if a storage-modifying operation is received by the processor core that conflicts with the buffered load target address of the load-reserve operation, setting a flag to a particular state; and in response to execution of a store-conditional instruction by the processor core, transmitting an associated store-conditional operation to the store-in lower level cache with a fail indication if the flag is set to the particular state so that the lower level cache will fail the store-conditional operation.

2. The method of claim 1, wherein:
the method further comprising the processor core concurrently executing at least first and second hardware-managed threads;
said load-reserve instruction belongs to the first hardware-managed thread;
said storage-modifying operation is generated by the second hardware-managed thread.

3. The method of claim 2, wherein:
- the storage-modifying operation is a store-conditional operation generated by execution of a store-conditional instruction in the second thread by the instruction execution unit; and
- the method further comprises the processor core receiving the storage-modifying operation during a reservation hazard window beginning when said processor core issues said store-conditional operation of said second thread to said lower level cache and ends when said store-conditional operation of said second thread succeeds or fails.

4. The method of claim 2, and further comprising the processor core serializing storage-modifying operations of the first and second hardware-managed threads in a store queue.

5. The method of claim 1, and further comprising the processor core receiving the storage-modifying operation during a reservation hazard window beginning when said processor core issues said load-reserve operation of said first thread to said lower level cache and ends when said lower level cache acknowledges establishment of a reservation for the load target address in the reservation logic.

6. The method of claim 1, and further comprising:
- in response to the load-reserve operation, the lower level cache recording in a reservation register the load target address and setting a reservation flag; and
- in response to receiving the store-conditional operation with the fail indication, the lower level cache transmitting an indication to the processor core that the store-conditional operation fails.

* * * * *